United States Patent
Nelson

[15] 3,668,975
[45] June 13, 1972

[54] DECELERATOR MEANS FOR EXPANSIBLE CHAMBER DEVICE

[72] Inventor: Vaughn A. Nelson, Downers Grove, Ill.
[73] Assignee: International Harvester Company, Chicago, Ill.
[22] Filed: Oct. 13, 1970
[21] Appl. No.: 80,367

[52] U.S. Cl............................................................91/409, 92/85
[51] Int. Cl.....................................................................F15b 15/22
[58] Field of Search................92/85; 91/26, 408, 409, 407, 91/396

[56] References Cited

UNITED STATES PATENTS

| | | | |
|---|---|---|---|
| 3,296,942 | 1/1967 | Nelson | 92/85 X |
| 2,755,775 | 7/1956 | Flick et al. | 91/26 |
| 3,323,422 | 6/1967 | Freese | 91/409 X |
| 3,559,538 | 2/1971 | Holder | 91/409 X |

Primary Examiner—Martin P. Schwadron
Assistant Examiner—Leslie J. Payne
Attorney—Noel G. Artman

[57] ABSTRACT

A decelerator means for a hydraulic motor having a housing, a piston movable therein defining an expansible fluid chamber within said housing, fluid ports permitting the admission or exhaust of fluid from said chamber, the decelerator means comprising a movable member within the chamber having an exposed surface capable of substantially closing off said port upon the exhaust of fluid from the chamber, said surface having interruptions therein so as to provide metering orifices to meter the exhaust of fluid from said chamber and retaining means interconnecting said housing and said movable member for maintaining said member in close proximity to the port but permitting sufficient limited movement whereby the admission of fluid energy into said chamber will be unimpeded by said member.

17 Claims, 5 Drawing Figures

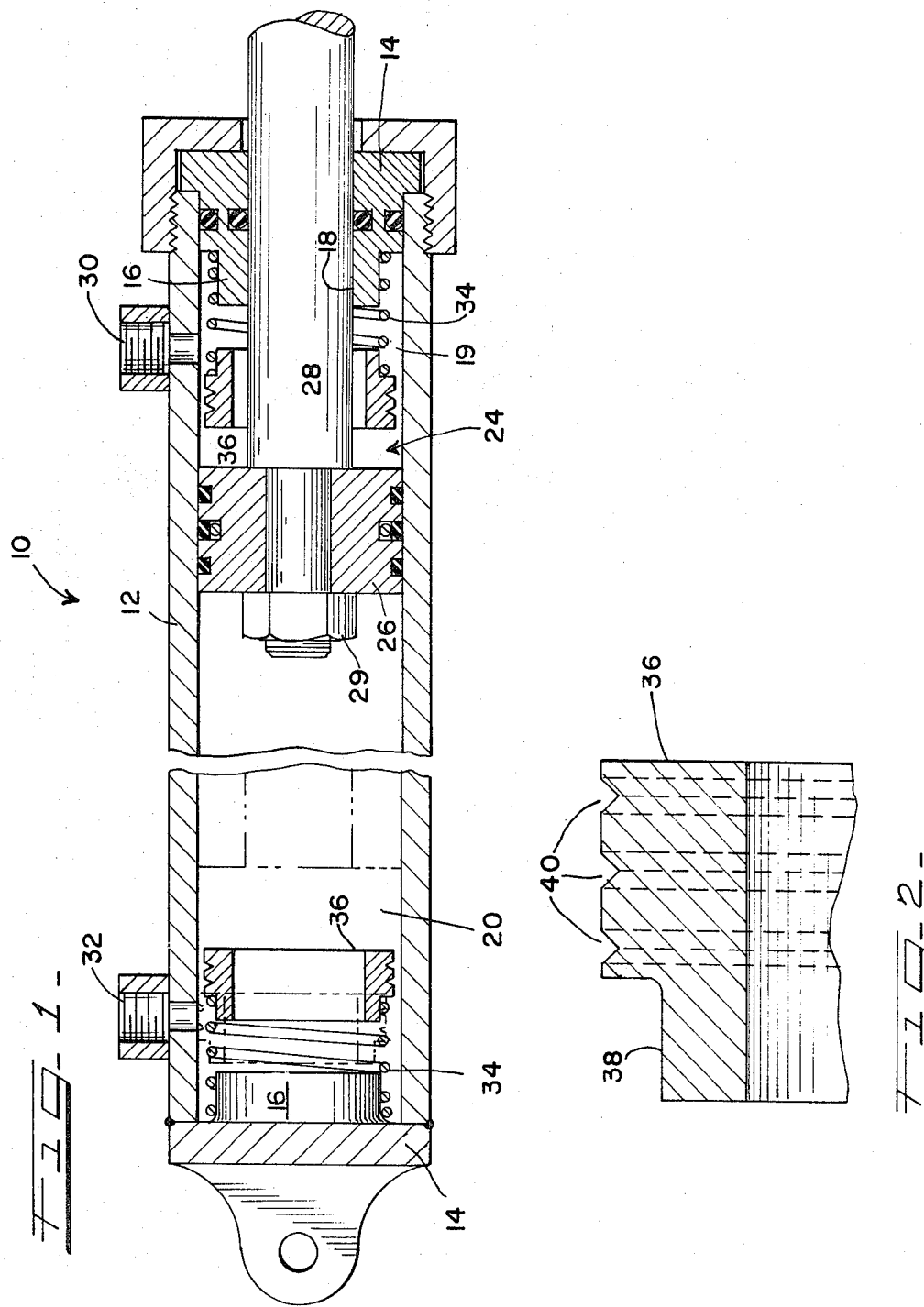

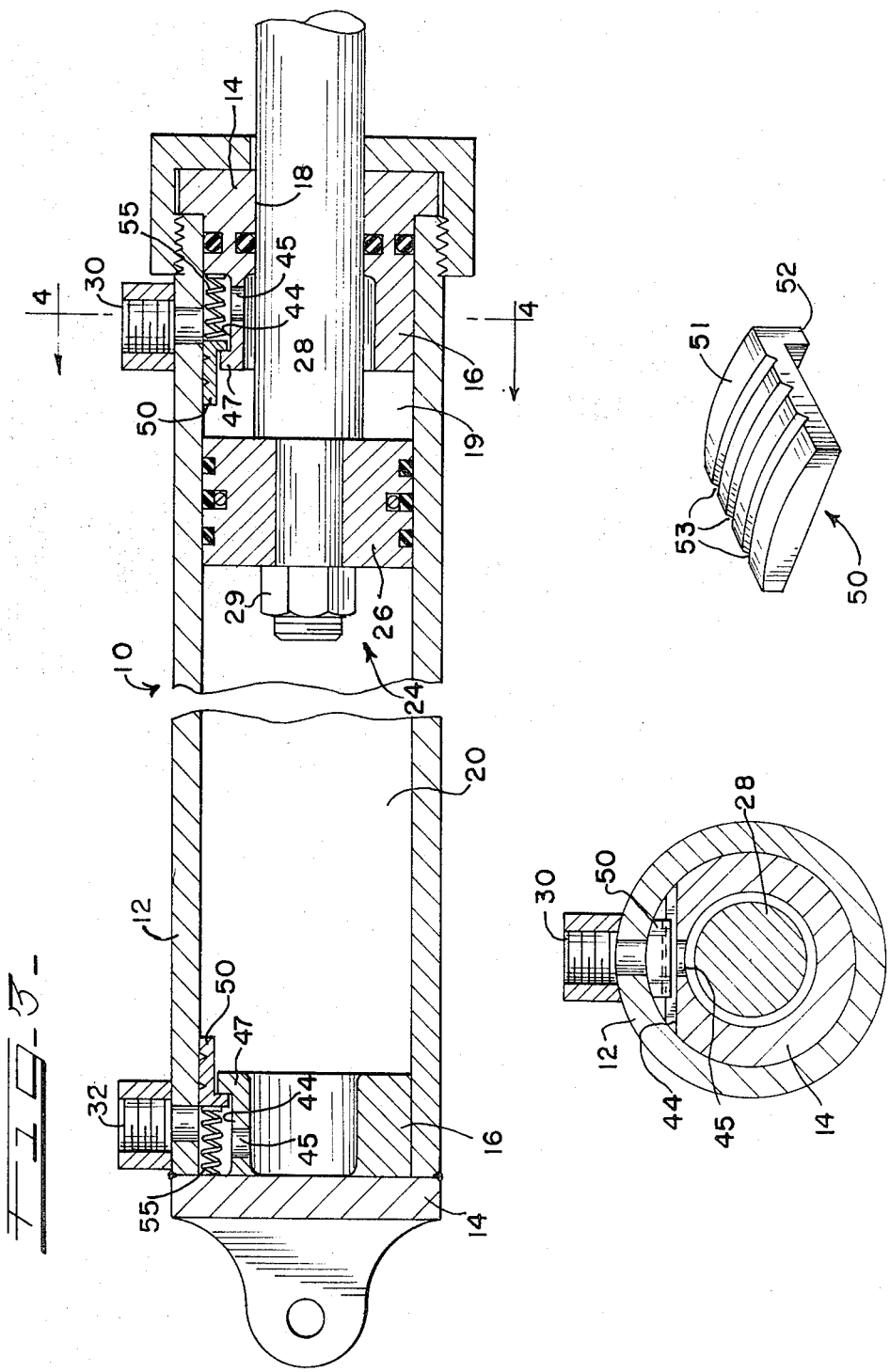

3,668,975

DECELERATOR MEANS FOR EXPANSIBLE CHAMBER DEVICE

BACKGROUND OF THE INVENTION

This invention relates to an expansible chamber. More specifically, it is related to the combination of such a device with a decelerating means whereby the exhaust of fluid from the chamber as an associated piston approaches the end of its stroke will be limited, thus permitting fluid pressure to build up within said chamber so as to apply a decelerating force to said piston. Such decelerator means are most useful in absorbing kinetic energy which has been imparted to a load by a hydraulic motor, and is necessary to absorb such kinetic energy as the motor approaches the end of its stroke. Without such means, the piston of said motor might strike the housing thereof with such force as to rupture the housing or otherwise require excessive structural design considerations.

Many examples of various decelerator means exist in the prior art. U.S. Pat. No. 3,296,942 issued to Vaughn A. Nelson and assigned to International Harvester Company, Inc. is one example of such decelerator means. In this disclosure, decelerator rings are carried by a cup-shaped member attached to the piston itself, and are capable of radial movement within the cylinder whereby as the piston approaches the end of its stroke, an efflux jet may draw the decelerator ring into close frictional contact with the cylinder walls and thus the decelerator substantially closes off exhaust of fluid from the contracting chamber so as to build up fluid pressure therein and absorb the kinetic energy associated with the load as well as with continued fluid input energy in the opposite chamber. Grooves within this decelerating ring, meter such fluid out of the contracting chamber at a reduced and meter rate.

Although such decelerator rings have proven to be economical and effective for the purpose intended, some improvement thereof is believed to be most beneficial. For example, scoring of the interior cylinder wall on the rod end may occur as the piston is reciprocated. Similarly, manufacture of such decelerator rings is somewhat difficult for the reason that the metering grooves must be carefully dimensioned, and normally the placing of the grooves on the rings themselves takes place prior to any heat treatment. Subsequent heat treatment often affects the concentricity of the ring, and it again must be machined, thus affecting the dimensions of the ring and the metering orifices.

Due to the requirement of the actual shifting of the ring towards and away from the delivery end exhaust ports, the ring must have a much smaller outside diameter than the internal diameter of the cylinder. Thus, the internal surface of the hydraulic cylinder adjacent to the port will not be exactly complementary with the external surface of the decelerating ring, and such will again affect the size of the metering grooves. Also, it is believed that as the decelerating ring is drawn toward the exhaust port, the contact of that ring with the internal cylinder wall is one of line contact initially but as the fluid energy acts against the interior surface of the ring, the ring itself is distorted so as to completely overlie the exhaust port. Thus, these changes of the concentricity of the ring during operation have an affect upon metering and are believed to occasionally create scoring of the interior cylinder wall.

SUMMARY OF THE INVENTION

Accordingly, the instant invention relates to decelerator means which is carried by the housing of the hydraulic motor so as to limit the possibility of scoring of the interior cylinder wall of the hydraulic motor upon reciprocation. The instant invention utilizes retaining means interconnected between the decelerator member and the motor housing so as to maintain the member in close proximity to the exhaust port of the motor but yet permit relative movement between this exhaust port and the decelerating member whereby the admission of fluid into the associated chamber will not be impeded in any substantial manner.

Accordingly, it is the principle object of the instant invention to provide a decelerator means for a hydraulic motor which is carried by the housing of said motor in close proximity to an exhaust port. As a further object of the instant invention, we provide an internal decelerating means which eliminates the problem of scoring of the interior wall of the hydraulic motor and which permits the designer to substantially ignore exotic concentricity tolerance requirements so as to minimize machining and manufacturing operations and to eliminate additional parts. Finally, it is an object of the instant invention to provide a decelerator means which will not be subject to distortion while performing its decelerator function, and to provide a member in which the grooves may be accurately designed and utilized without requiring trial and error procedure in the manufacturing operations so as to reach the designed orifice area. Lastly, it is an object of the instant invention to provide a decelerator member which can be made by inexpensive methods and material (for example, powered metal technology) so as to substantially reduce cost of manufacture.

DESCRIPTION OF THE DRAWINGS

The manner in which the objects of this invention is obtained will be made clear by a consideration of the following specification and claims when taken in conjunction with the accompanying drawings, in which:

FIG. 1 is a side elevational view of a rectilinear type hydraulic motor depicting the decelerator member therein;

FIG. 2 is a side elevational view taken through the center line of the decelerator member depicting the metering orifices of such member;

FIG. 3 is a side elevational view of a hydraulic motor having another embodiment of the decelerator means therein;

FIG. 4 is an elevational view taken along the lines 4—4 of FIG. 3; and

FIG. 5 is a perspective view of the decelerator member utilized in conjunction with FIG. 3.

DETAILED DESCRIPTION

As depicted in FIGS. 1 and 2, one of the preferred embodiments depicts a hydraulic motor assembly 10 having a cylinder 12 closed by end caps 14, 14 with a piston rod 28 passing through an aperture 18 in one of the end caps. To the piston rod 28 is attached a piston 26 by means of a nut 29 which secures the piston on a reduced diameter of the piston rod 28. Each of the end caps 14, 14 have projecting inwardly thereon an abutment 16 which may serve as a portion of the retaining means for a decelerating member of this embodiment. Additionally, abutting means 16 may act to limit the travel of the piston 26. Ports 30 and 32 are provided at each end of the cylinder 12 on adjacent sides of the piston 26 so as to divide the housing into two chambers 19 and 20. Thus, fluid energy may be directed into chamber 19 through the port 30 so as to expand this chamber and move the piston to the left, contracting chamber 20, the fluid exhausting therefrom through the port 32. In close proximity to the ports 30 and 32, I have provided a decelerating ring 36 which is generally cylindrical in shape and having an outside diameter substantially less than the internal diameter of the cylinder 12 so as to permit radial movement of this member within the housing 12. Resilient means 34 are interposed between the abutment 16 and a projection 38 of the decelerating ring, and preferably a relatively strong frictional fit interconnects the spring 34 with the retaining member 16 and the members 36, 36. Accordingly, it should be clear that the decelerating member 36 is permitted longitudinal movement within the cylinder itself by virtue of expansion and contraction of the spring 34, and axial movement due to the relative diameters of the decelerating member 36 and the housing of cylinder 12.

Referring to FIG. 2, an enlarged section of decelerating member 36 depicts grooves 40 in the external surface of the decelerating member. The purpose of the grooves is to provide an orifice between the decelerating member 36 and the associated ports 32 or 30. Such fluid will be exhausted from chamber 20 or 19 only through the metering grooves as the piston approaches the end of its stroke. This limitation on fluid exhaust is effective to build up pressure within the contracting chambers 20 or 19 so as to absorb the kinetic energy of the moving of the load which is moved by the piston 26 and to further absorb fluid energy which is still being directed into the opposite chamber whereby the piston may continue to be driven until it reaches the end of its stroke. Obviously, the size and number of grooves would be most dependent upon the amount of energy to be absorbed and the pressure which is desired to be built up within the appropriate chamber so as to absorb such energy.

MODE OF OPERATION

To consider the operation of the device of FIGS. 1 and 2, assume that the piston rod 28 has a load attached thereto at its exterior end and fluid energy is being directed into chamber 19 through the port 30. Such fluid energy will cause chamber 19 to expand and consequently chamber 20 must contract, such contraction resulting in the exhaust of fluid from port 32. As the piston is traveling through the majority of its stroke the port 32 is completely uncovered and there is no substantial impediment to exhaust the fluid therefrom. However, as the piston 26 and the load approaches the end of its stroke, the piston will contact decelerating ring 36, and urge same to the left. Simultaneously, as the decelerating member moves leftwardly, dynamic forces will cause the decelerator ring to move upwardly (as viewed in the drawing) such that the decelerator ring overlies the exhaust port 32. At this time it should be apparent that fluid can exhaust from the chamber 20 only through the metering grooves 40 and such is effective to cause a pressure rise of fluid flow into chamber 20.

Consequently, it should be appreciated that the instant invention discloses a decelerating member which is internally associated with the housing, and is not caused to move with the piston member 26 so as to minimize scoring of the internal surface of the cylinder 12. Such members may be associated with either or both chambers 19 and 20 so as to effect deceleration in an identical manner in either direction.

Turning now to FIGS. 3 through 5, another preferred embodiment is also depicted in a double-acting rectilinear hydraulic motor in which the motor components are substantially identical to those depicted in FIGS. 1 and 2 with certain minor modifications. Thus, the cylinder 12 with the modified ends caps 14, 14 in conjunction with piston 26 divide the hydraulic motor into two chambers 19 and 20. As herein disclosed, the end caps have an abutment 16 protruding inwardly therefrom substantially beyond the ports 30 and 32.

To incorporate the decelerating member into this hydraulic cylinder, grooves 44, 44 are machined or formed in any manner in the exterior surface of the abutting projections 16, 16 adjacent ports 30, 32. However, it is suggested that the interiormost portion of these abutments 16 be formed so as to provide a retainer or lip 47 thereon.

The decelerating member 50 which operates in conjunction with this groove 44 is more clearly depicted in FIG. 5 and such essentially comprises a bar having an exterior surface 51 which is complementary to the internal surface of the housing 12. Consequently, the surfaces mate and such is preferable to the annular ring in which they are only of similar configuration. The internal surface of the member 50 is shown here as being flat, but may be of any particular design. However a projection or lip 52 is formed on the exterior end of such members so as to engage with retainer 47. Thus the major body portion of the member 50 is free to reciprocate inwardly from the projection 47 of abutment 16, to be limited only by engagement of projections 52 and 47. Too, substantial clearance should be provided for member 30 in a radial direction to permit limited radial movement. Aperture 45 may be drilled into the abutment 16 adjacent the groove 44 so as to normally insure unimpeded flow into and out of the associated chamber, while resilient means 55 may be interposed between the decelerating member 50 and the end cap 14 so as to preclude the member 50 from prematurely closing the port 32. Interruptions or grooves 53 may be formed in the external surface 51 of member 50 to effect the desired metering action.

MODE OF OPERATION

Assuming the fluid energy is being directed to chamber 19 through the port 30 and the aperture 45, as well as flowing about the loose clearance between the abutment 16 and member 50, it should be appreciated that chamber 19 will expand and chamber 20 will contract, fluid being exhausted from chamber 20 primarily through the aperture 45 and the port 32. Inasmuch as the decelerating member is urged toward the interior of the cylinder 12, there should be no impediment to the exhaust of fluid from chamber 20. As the piston 26 approaches the limit of its stroke, and as it is desired at that time to absorb the kinetic energy due to any load carried by the rod 28, the leftwardmost face of the piston 26 will engage the forward surface of the member 50 so as to urge the same outwardly. As this member is being urged outwardly, dynamic forces acting on the member itself will insure that the complementary surfaces (the exterior surface 51 of member 50 and the interior surface of cylinder 12) are mated so as to substantially preclude the flow of fluid from chamber 20. An exception however results from the interruptions 53 in the surface 51, and these interruptions in the form of grooves will permit metered flow from the chamber 20. Such metered flows should naturally be designed so as to develop a pressure within chamber 20 sufficient to absorb both the kinetic energy of a load associated with piston rod 28 and the continued flow of input energy into chamber 19. Thus as the piston is slowly brought to a stop and as it reaches the limit of its stroke, chamber 20 will no longer contract and there is no dynamic force urging the decelerating member 50 against the interior wall of the cylinder 12 so as to close off the port 32. At such time no forces other than the resilient force of spring 55 is acting upon the member 50.

As soon as it is desired to move the piston in the opposite direction, fluid energy is directed to port 32, and such fluid energy will be effective to move the member 50 radially inward (due to the substantial clearances) whereby flow may continue unimpeded into chamber 20, with the chamber 19 contracting. As soon as the piston approaches the end of its stroke in the opposite direction, decelerating member 50 will be urged into position so as to meter fluid flow out of chamber 19, and the previous cycle is repeated with respect to the right end of the cylinder.

It is believed that the embodiment of FIGS. 3 through 5 is most preferably in terms of precluding the scoring for the reason that the exterior surface 51 may be provided with the exact complementary surface of the interior of the cylinder 12. Consequently, due to this exact concentricity between the two surfaces, there should be no distortion of the member 51, and an area contact should immediately be made between the two surfaces. Similarly, it is believed that member 50 may appropriately be easily machined or in the alternative be simply manufactured from powered metal.

Accordingly, applicant herein has proffered a decelerating means for a hydraulic motor which is effective to minimize scoring of the interior wall or cylinder, which substantially reduces the cost of an internal decelerator means, and substantially reduces high tolerance requirements. Further, it is believed that the utilization of these embodiments will substantially aid in reducing the design variables for the dimensions of the metering orifices in instances where the decelerator member can have an external surface which is always complementary to the internal surface of the housing. The invention may also be utilized in any type of expansible chamber device where energy is to be absorbed and is not to be regarded as being restricted to the hydraulic motors of the rectilinear type. Similarly, the interruptions may consist of apertures through the decelerator member as well as grooves.

I claim:

1. In an expansible chamber device having a housing, piston means therein and a fluid exhaust port permitting exhaust of fluid from the housing, the improvement comprising:
   a. a decelerator member, means mounting said member on the interior of said housing adjacent the exhaust port, said member having an exterior surface contour similar to the interior contour of the motor housing adjacent said exhaust port so as to overlie and cover said exhaust port when engaged by the piston as the piston approaches the end of its stroke whereby said member is urged by the exhaust flow of fluid to cover said exhaust port,
   b. said member having interruptions within said surface contour so as to permit metered flow from said exhaust port.

2. An apparatus as recited in claim 1 in which the expansible chamber device and said decelerator member is annular.

3. An apparatus as recited in claim 2 in which said mounting means is resilient and biases said member away from said port.

4. An apparatus as recited in claim 1 in which resilient retaining means interconnect said member with said housing.

5. An apparatus as recited in claim 1 in which said member has an exterior surface complementary to the interior surface of said housing.

6. An apparatus as recited in claim 5 in which the expansible chamber device is a cylindrical rectilinear hydraulic motor and the surface of said member represents a sector of a cylinder of substantially the same radius as the cylinder.

7. A decelerator device for a hydraulic motor having a housing, a piston forming a chamber therein and a port adapted to permit exhaust of fluid therefrom, the device comprising:
   a. a member loosely carried by the housing adjacent said exhaust port and having a surface thereon adapted to selectively substantially close said port,
   b. interruptions in said surface for permitting metered flow through said exhaust port when said surface closes said port,
   c. engaging surfaces between said piston and said member for moving said member adjacent said port as said motor approaches the end of its stroke whereby dynamic fluid forces cause said member to substantially close said port and effect metering of fluid.

8. An apparatus as recited in claim 7 in which said motor and said member are annular.

9. An apparatus as recited in claim 7 in which said surface of said member is adapted to mate with the internal surface of said housing.

10. A decelerator device for a hydraulic motor having a cylinder with an exhaust port, said device comprising:
    a. a retaining means carried by said cylinder adjacent said port,
    b. a member carried by said retaining means in a manner permitting limited movement thereof,
    c. an interrupted surface on said member of similar configuration to an interior surface of said motor adjacent said exhaust port,
    d. said member being responsive to fluid flow so as to position itself over said exhaust port as the motor approaches the end of its stroke.

11. In an expansible chamber device having piston means and a fluid port, an improved decelerating means comprising:
    a. a decelerating member within the expansible chamber device,
    b. means carried by and within the chamber for maintaining the decelerating member in proximity to the port, but for permitting limited movement thereof in directions both normal and parallel to said port,
    c. said member having a surface with interruptions therein and mating with and adapted to substantially cover said port as the piston approaches the end of its stroke whereby fluid being displaced by movement of the piston may exhaust from said chamber device only through said interruptions.

12. An apparatus as recited in claim 11 in which:
    a. said expansible chamber device is a cylindrical hydraulic motor, and
    b. said decelerator member is an annular ring having grooves formed in the external surface of said annular member.

13. An apparatus as recited in claim 11 in which:
    a. said means for maintaining the decelerating member in proximity to the port is resilient.

14. An apparatus as recited in claim 12 in which:
    a. said means for maintaining the decelerating member in proximity to the port is resilient.

15. An apparatus as recited in claim 11 in which:
    a. said expansible chamber device is a cylindrical hydraulic motor, and
    b. said decelerating member is a sector of a cylinder with its external diameter substantially the same as that of the internal diameter of the cylinder, with said interruptions consisting of grooves in said external surface.

16. An apparatus as recited in claim 15 in which:
    a. said means for maintaining the device in proximity to the port comprises interfering surfaces between the decelerator member and an internal portion of the expansible chamber device.

17. An apparatus as recited in claim 16 in which:
resilient means are interposed between the decelerating member and the expansible chamber device so as to normally bias said decelerating member away from said port in a direction parallel thereto.

* * * * *